(12) United States Patent
Hennebert et al.

(10) Patent No.: US 11,695,553 B2
(45) Date of Patent: Jul. 4, 2023

(54) GENERATION OF A MULTI-USER CONTEXTUAL PORTFOLIO OF PRIVATE KEYS AND USE OF SUCH A PORTFOLIO

(71) Applicant: COMMISSARIAT A L'ENERGIE ATOMIQUE ET AUX ENERGIES ALTERNATIVES, Paris (FR)

(72) Inventors: Christine Hennebert, Grenoble (FR); Florian Barrois, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 145 days.

(21) Appl. No.: 17/014,860

(22) Filed: Sep. 8, 2020

(65) Prior Publication Data
US 2021/0075603 A1 Mar. 11, 2021

(30) Foreign Application Priority Data
Sep. 9, 2019 (FR) ..................................... 19 09897

(51) Int. Cl.
*H04L 9/08* (2006.01)
*H04L 9/06* (2006.01)
(Continued)

(52) U.S. Cl.
CPC ....... *H04L 9/0861* (2013.01); *G06Q 20/3825* (2013.01); *G06Q 20/3829* (2013.01);
(Continued)

(58) Field of Classification Search
CPC ... H04L 9/0861; H04L 9/0618; H04L 9/0894; G06Q 20/3825; G06Q 20/3829; G06Q 20/363; G06Q 20/3674
See application file for complete search history.

(56) References Cited

U.S. PATENT DOCUMENTS 9,935,772 B1 * 4/2018 Madisetti ............ G06F 21/6209
10,491,404 B1 * 11/2019 Yamamoto ................ H04L 9/50
(Continued)

FOREIGN PATENT DOCUMENTS

EP           3268914 B1 *  6/2018  ............. H04L 9/008
WO   WO-2020053851 A1 *  3/2020  ............. H04L 9/085

OTHER PUBLICATIONS

"Anonymous", "Bitcoin Developer's Guide", May 11, 2015 (Year: 2015).*
(Continued)

*Primary Examiner* — Darshan I Dhruv
(74) *Attorney, Agent, or Firm* — Oblon, McClelland, Maier & Neustadt, L.L.P.

(57) ABSTRACT

A method of generating a hierarchical deterministic keys portfolio, in particular to sign transactions sent to a blockchain. The generation method includes an initialization phase by an administrator and a phase of setting parameters for at least one user. Private key usage contexts are created from the administrator account, each context specifying conditions for use of the private key in said context. User accounts are also created, each user account being associated with a private key in the tree structure, the private key of said user being obtained from a master private key of the administrator, the usage context to which the user account is attached, and the user's identifier.

18 Claims, 6 Drawing Sheets

(51) Int. Cl.
*G06Q 20/38* (2012.01)
*G06Q 20/36* (2012.01)

(52) U.S. Cl.
CPC .......... *H04L 9/0618* (2013.01); *H04L 9/0825* (2013.01); *H04L 9/0894* (2013.01); *G06Q 20/363* (2013.01); *G06Q 20/3674* (2013.01)

(56) References Cited

U.S. PATENT DOCUMENTS

| | | | | |
|---|---|---|---|---|
| 2016/0269182 | A1* | 9/2016 | Sriram | H04L 9/0869 |
| 2018/0183774 | A1* | 6/2018 | Campagna | H04L 9/3247 |
| 2019/0220857 | A1* | 7/2019 | Black | G06Q 20/3827 |
| 2019/0280861 | A1* | 9/2019 | Smith | G06Q 20/4015 |
| 2019/0325408 | A1* | 10/2019 | Goroff | G06Q 20/3825 |
| 2020/0067907 | A1* | 2/2020 | Avetisov | H04L 9/50 |
| 2020/0219094 | A1* | 7/2020 | Dikhit | H04L 9/3247 |
| 2021/0056547 | A1* | 2/2021 | Monica | G06Q 20/3674 |
| 2021/0083872 | A1* | 3/2021 | Desmarais | H04L 9/3247 |

OTHER PUBLICATIONS

U.S. Appl. No. 16/234,020, filed Dec. 27, 2018, 2019/0207760 A1, Hennebert.
U.S. Appl. No. 16/233,974, filed Dec. 27, 2018, 2019/0207757 A1, Hennebert.
U.S. Appl. No. 16/363,395, filed Mar. 25, 2019, 2019/0294817 A1, Hennebert et al.
U.S. Appl. No. 16/363,546, filed Mar. 25, 2019, 2019/0294822 A1, Hennebert.
French Preliminary Search Report dated Apr. 23, 2020 in French Application 19 09897 filed on Sep. 9, 2019 (with English Translation of Categories of Cited Documents), 3 pages.
Anonymous: "Developer Guide—Bitcoin", XP055519712, May 11, 2015, 48 pages, URL:https://web.archive.org/web/20150511232019/https://bitcoin.org/en/developer-guide.
Kiara Robles, et al., "Hierarchical Deterministic Keys for Bootstrapping a Self-Sovereign Identity", Jul. 18, 2016, XP055688469, 5 pages, URL:https://github.com/WebOfTrustInfo/rwot2id2020/blob/master/draftdocuments/hierarchic al-deterministic-keys-for-bootstrapping-a-self-sovereign-identity.md.
Sven Bugiel, et al., "Flexible and Fine-grained Mandatory Access Control on Android for Diverse Security and Privacy Policies", Proceedings of the 22nd USENIX Security Symposium, Open access to the Proceedings of the 22nd USENIX Security Symposium is sponsored by USENIX, Aug. 14-16, 2013, XP055688671, 17 pages https://www.usenix.org/system/files/conference/usenixsecurity13/sec13paper_bugiel.pdf.
Andreas M. Antonopoulos et al., "Mastering Ethereum"O'Reilly, Dec. 2018, 424 pages.

* cited by examiner

GENERATION OF A MULTI-USER CONTEXTUAL PORTFOLIO OF PRIVATE KEYS AND USE OF SUCH A PORTFOLIO

TECHNICAL FIELD

This invention relates to the general field of blockchains and more particularly to the field of deterministic portfolios of private keys that can be used in particular to sign transactions on blockchains.

STATE OF PRIOR ART

In the field of blockchains, transactions are messages signed by the private keys of different users and emanating from their corresponding accounts (according to the Ethereum terminology) or from their corresponding addresses (according to the Bitcoin terminology).

Each user account is associated with a public key-private key pair of an asymmetric cryptosystem, generally a cryptosystem on an elliptical curve, the identifier of the account being obtained by hashing the public key in question. The private key is known only to the user.

When the user wants to transmit a transaction to the blockchain from one of his accounts, he signs it with his private key, for example by means of the ECDSA (Elliptic Curve Digital Signature Algorithm) algorithm. Everyone can then check that the transaction has actually been signed by the account holder.

As a general rule, a user has a plurality of accounts, each account being uniquely associated with a private key-public key pair. Consequently, a user has a set of private keys, also called a keys portfolio or more simply a portfolio.

Conventionally, a distinction is made between non-deterministic (or random) portfolios and deterministic portfolios.

In a non-deterministic portfolio, also known under the acronym JBOK (Just a Bunch Of Keys), the keys are generated at random. This type of portfolio is not structured and therefore its management is complex. Furthermore, maintenance of the portfolio implies that relatively complex backup operations are made.

To overcome these difficulties, use is generally made of hierarchical deterministic portfolios wherein all private keys are generated in a tree structure from the same seed. In other words, with knowledge of the seed, it is possible to find all private keys of the portfolio.

FIG. 1 schematically represents the structure of such a hierarchical deterministic portfolio.

The seed, 110, at the origin of the keys portfolio is a random number (or entropy), for example on 128 or 256 bits. It is generally represented by a mnemonic code composed of 12 or 24 words drawn from a predetermined dictionary comprising a predetermined number of words (2048).

The seed is then hashed (for example by means of the HMAC-SHA hashing function 512), to give firstly a master private key, 120, ($k_m$) and an associated chain code (not represented).

The master public key is then calculated from the master private key using $PK_m = k_m \cdot G$ wherein G is the elliptical curve generation point.

In each generation, a child parent key, 140, with birth rank i+1 (the first child corresponding to the null index), is obtained from a private parent key, 130, of the chain code associated with this key and an index number, i. Generation of the private key makes use of a hashing function (or a combination of hashing functions) making it impossible to obtain a parent private key from the private key of a child.

Different methods can be used to generate private keys in a hierarchical deterministic portfolio.

FIG. 2A represents a first method of generating private keys in a hierarchical deterministic portfolio.

Elements related to a parent private key are represented at the left of the figure, and elements related to a child private key derived from this parent private key are represented at the right.

The parent private key, $k_{parent}$, firstly generates the corresponding public key in the asymmetric cryptosystem, for example $PK_{parent} = k_{parent} G$ in the case of a cryptosystem on an elliptical curve.

The parent public key $PK_{parent}$ is concatenated to the associated code chain, $CCK_{parent}$, to form an extended public key $PK_{parent}^{ext} = PK_{parent} | CCK_{parent}$. This extended public key is combined with the index, i, of the child key that is to be generated, the assembly is then hashed using a hashing function, Hash.

The result of hashing is divided into a left part and a right part. The left part is combined with the parent private key, $k_{parent}$, to give the child private key, $k_{child}$ while the right part gives the code associated with the child key, namely $CCK_{child}$. The child private key, $k_{child}$, is used to generate the child public key, $PK_{child} = k_{child} G$.

Consequently, elements $k_{child}$, $PK_{child}$, $CCK_{child}$ are available to iterate the generation of private keys once again.

The generation operation used to pass from a parent private key to a child key with index i is denoted herein $CKD_{priv}^n$. In other words:

$$k_{child} = CKD_{priv}^n(k_{parent}, i) \tag{1}$$

and therefore by recurrence:

$$k_{child} = CKD_{priv}^n(\ldots CKD_{priv}^n(CKD_{priv}^n(k_m, i_1), i_2)), \ldots, i_N) \tag{2}$$

wherein N is the path length in the tree structure starting from the seed, and wherein $i_1, \ldots, i_N$ is the succession of indices of child keys along the path.

FIG. 2B represents a second method of generating private keys in a hierarchical deterministic portfolio.

This generation method, called the hardened method in contrast to the previous method called the normal method, uses an extended private key instead of an extended public key to generate a private key in the next generation. It is a priori more robust than the normal method because it omits public information from the calculation.

As before, elements related to the parent private key are represented at the left of the figure, and elements related to a child private key derived from this parent private key are represented at the right.

The parent private key, $k_{parent}$, is concatenated with the associated code chain to form an extended private key $k_{parent}^{ext} = k_{parent} | CCK_{parent}$.

This extended private key is combined with the index, i, of the child key that is to be generated, the assembly is then hashed using a hashing function, Hash.

The result of hashing is divided into a left part and a right part. The left part is combined with the parent private key, $k_{parent}$, as before, to give the child private key, $k_{child}$ while the right part gives the code chain associated with the child key, namely $CCK_{child}$. The child private key, $k_{child}$, is used in turn to generate the child public key, $PK_{child} = k_{child} G$.

The generation operation used to pass from a parent private key to a child key with index i is called the hardened generation operation and is denoted herein $CKD_{priv}^h$. In other words:

$$k_{child} = CKD_{priv}^h(k_{parent}, i) \tag{3}$$

If only hardened generation operations are used, the following is obtained by recurrence:

$$k_{child} = CKD_{priv}^{h}( \ldots \ CKD_{priv}^{h}(CKD_{priv}^{h}(k_m,i_1), i_2)), \ldots, i_N) \quad (4)$$

wherein, as before, N is the path length in the tree structure starting from the seed, and wherein $i_1, \ldots, i_N$ is the succession of indices of child keys along the path.

It will be noted that a private key of the portfolio can be generated by successively using normal generation operations and hardened generation operations along the path. Thus, more generally, this private key will be obtained by:

$$k_{child} = CKD_{priv}( \ldots \ CKD_{priv}(CKD_{priv}(k_m,i_1), i_2)), \ldots, i_N) \quad (5)$$

wherein each elementary generation operation $CKD_{priv}$ can be a normal generation operation $CKD_{priv}^{n}$ or a hardened generation operation $CKD_{priv}^{h}$.

In practice, the indices i used in normal generation operations and hardened generation operations take their values within distinct intervals. Thus, the indices varying from 0 to $2^{31}-1$ are used to generate private keys according to a normal generation operation and indices varying from $2^{31}$ to $2^{31}-1$ are used to generate private keys according to a hardened generation operation.

In all cases, a private key can be identified by means of a path in the tree structure starting from the master key. Thus for example, $k_m/0/3$ will denote the second generation private key, $4^{th}$ normal child of the parent key, itself the first normal child of the master private key. Similarly, $k_m/0/3'$ will denote the second generation private key, $4^{th}$ hardened child of the parent key, itself the first normal child of the master private key, in which the convention used is $i'=i+2^{31}$.

Hierarchical deterministic portfolios were normalized in documents BIP-32 and BIP-44. A detailed description of hierarchical deterministic portfolios can be found in the book by A. M. Antonopoulos and G. Wood entitled "Mastering Ethereum" published by O'Reilly in December 2018, pp. 79-97.

Hierarchical deterministic portfolios can be stored in physical devices, generally mobile personal devices, for example dongles. Thus, when a user would like to sign a transaction using one of his private keys, he firstly authenticates himself with his personal device using a PIN code (or a password), to unlock his portfolio, then selects the account from which he intends to send the transaction in the portfolio, and finally signs the transaction with the private key attached to this account by performing a physical action, for example by pressing on a button of the personal device in question.

The structure of hierarchical deterministic portfolios has been normalized in the prospect of an episodic emission of transactions based on cryptocurrencies. The structure of a path in the portfolio tree structure thus follows a format adapted to this usage case, defined in document BIP-44 by:

m/purpose'/coin_type'/account'/change/address_index wherein the field "m" relates to the master key, the "purpose" field relates to the standard considered (in this case the value 44 for BIP-44), the "coin_type" field specifies the cryptocurrency used, the "account" field specifies an account from which the user can subdivide his portfolio into subaccounts, the "change" field makes a distinction between receiving addresses and change addresses when possible depending on the blockchain (this is the case particularly in Bitcoin but not in Ethereum), and finally the "address_index" field allows a user to distinguish his different accounts for the same cryptocurrency.

This portfolio structure is suitable for individual users performing isolated actions in cryptocurrencies. However, it is inappropriate when different users perform more complex operations that have to be attached to the same entity (for example a legal entity, an administrator) and controlled by this entity under predetermined conditions. In particular with such a portfolio structure, human operators, or even automatic devices, could perform operations at clients, guaranteeing that authors of transactions are anonymous with regard to third parties, while enabling traceability and control of these transactions by the entity in question.

Consequently, one purpose of this invention is to disclose a method of generating and using a deterministic portfolio of private keys capable of firstly attaching signatures of transactions of a plurality of users to a common entity, and secondly being able to sign these transactions under conditions controlled by this entity.

PRESENTATION OF THE INVENTION

This invention is defined by a method of generating a hierarchical deterministic keys portfolio containing private keys according to a tree structure, in particular to sign transactions sent to a blockchain, said method comprising an initialization phase during which:
an administrator account is created, access to the administrator account being protected by an administrator authentication element;
a master private key is generated by hashing a random seed, the master private key being stored in a secure memory zone;
said method being specific in that it also comprises a parameter setting phase wherein:
a plurality of usage contact identifiers is created from the administrator account, each usage context identifier pointing to an address in the secure memory area in which conditions for use of a private key in said context are stored;
a plurality of user accounts is created from the administrator account, each user account being associated with a private key in the tree structure, each user account being identified by an identifier and its access being protected by a user authentication element, the private key of said user being obtained from the master private key, of the usage contact to which the user account is attached, and the user's identifier.

Preferably, the user's private key, $k_{user}$, is obtained by means of $k_{user} = CKD_{priv}(CKD_{priv}(CKD_{priv}(k_m,c(i)),Ind_1)),Ind_2)$ wherein $CKD_{priv}$ designates a normal or hardened operation to generate a child private key from a parent private key in the tree structure, c(i) is the usage context identifier to which the user account is attached and $Ind_1, Ind_2$ represents a pair of indices extracted from a result of hashing the user identifier using at least one hashing function.

According to a first variant, the normal generation operation comprises the generation of a parent public key ($PK_{parent}$) from the corresponding parent private key ($k_{parent}$), concatenation with the parent public key of a parent chain code ($CCK_{parent}$) to obtain an extended public key ($PK_{parent}^{ext}$), the combination of said extended public key with a child key index (i) that it is wished to generate, the result of said combination being hashed to provide a hashing result, a first part of the hashing result being combined with the parent private key to give the child private key, a second part of the hashing result providing a child chain code ($CCK_{child}$).

According to a second variant, the hardened generation operation comprises concatenation with the parent private key ($k_{parent}$) of a parent chain code ($CCk_{parent}$) to obtain an extended private key ($PK_{parent}^{ext}$), the combination of said extended private key with a child key index (i) that it is wished to generate, the result of said combination being hashed to provide a hashing result, a first part of the hashing result being combined with the parent private key to give the child private key, a second part of the hashing result providing a child chain code ($CCk_{child}$).

Stored usage conditions with regard to an initialization context can be chosen from among a predetermined geographic area, a predetermined time range, an association with a predetermined host device or a connection to a predetermined network.

The user's private key can be used as a starting point to generate the user's corresponding public key ($PK_{user}$) in an asymmetric cryptosystem and to hash this user's public key to obtain a user account address ($account_{user}$), the address of the user account being stored in the user account.

This invention also relates to the use of a hierarchical deterministic keys portfolio generated by a generation method like that defined above, to sign a transaction addressed to a blockchain, said portfolio having been parametered for at least one user and being hosted on a mobile device connected to a host device through a secure channel, use of this hierarchical deterministic keys portfolio being specific in that:
- said user identifies himself using his user identifier and authenticates himself with the mobile device or the host device using an authentication element;
- said user fills in a usage context identifier with the mobile device or the host device;
- the mobile device hashes the identifier and uses it to deduce at least one index ($Ind_1, Ind_2$), verifies in the portfolio that there is an existing user account associated with the usage context and with the index thus obtained, then verifies that the user's authentication element is the same as that stored in a secure memory area of the mobile device, at an address specified by the user account; and if this is successful,
- verifies if the context data supplied by a sensor of the mobile device satisfy the usage conditions stored in the secure memory area at an address stored in the user account; and if these conditions are satisfied,
- signs a transaction formed by the host device by means of the user's private key, the transaction thus signed being returned to the host device to be transmitted to the blockchain.

According to a first variant, the signature of the transaction by means of the user's private key is made automatically by the host device, without any action by the user.

According to a second variant, the signature of the transaction by means of the user's private key also requires a physical action by the user on an element of the mobile device.

In all cases, the transaction is generally sent from the user account address obtained by hashing the user public key stored in the user account.

BRIEF DESCRIPTION OF THE DRAWINGS

Other characteristics and advantages of the invention will become clear after reading a preferred embodiment of the invention, described with reference to the appended figures among which.

DETAILED PRESENTATION OF PARTICULAR EMBODIMENTS

Figure 1:
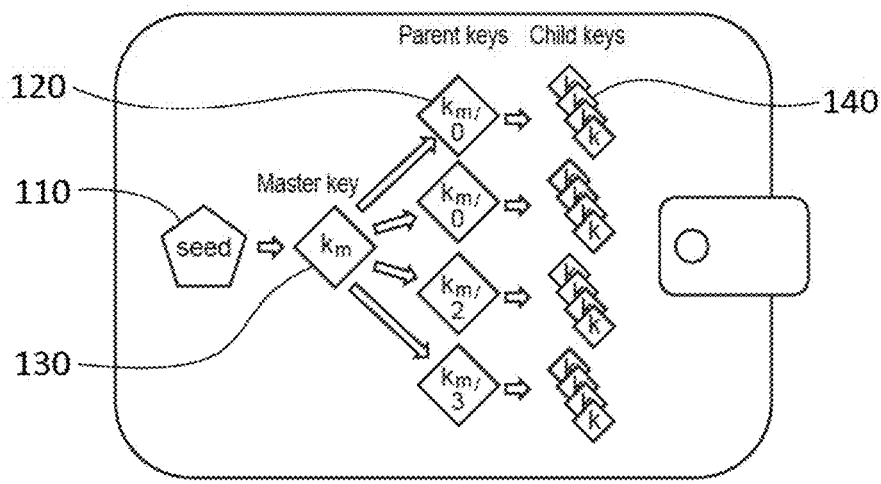
FIG. 1, already described, diagrammatically represents the structure of a hierarchical deterministic type of keys portfolio.
Figure 2A:
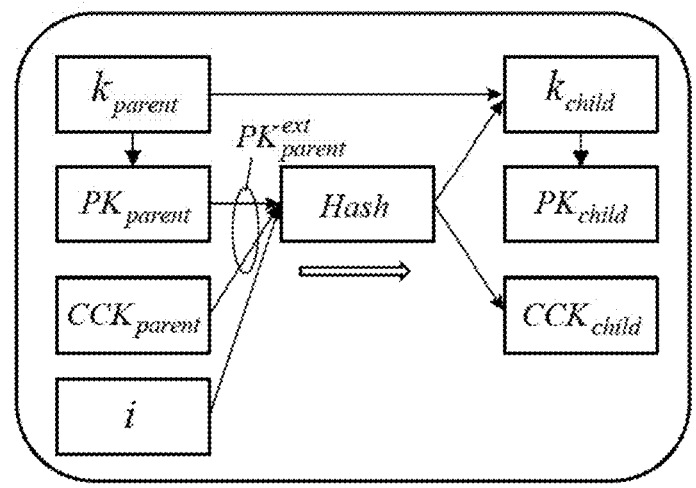
FIG. 2A and FIG. 2B diagrammatically illustrate first and second known methods of generating private keys in a hierarchical deterministic type of keys portfolio.
Figure 2B:
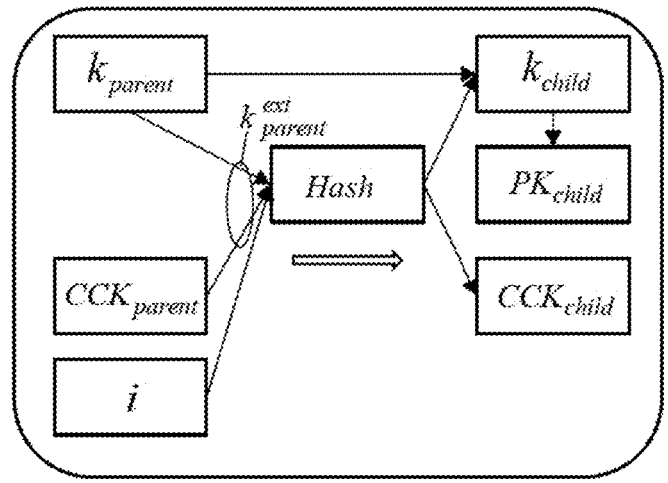

In the following, we will consider a hierarchical deterministic keys portfolio according to the meaning used above, particularly a portfolio conforming with standards BIP-32 and BIP-44. Such a portfolio has a tree structure in which a private key associated with a node v of the tree structure, is generated by means of a hashing function from the extended public key or the extended private key associated with the parent node of v and with an index, i, giving the birth rank of the key as described with reference to FIGS. 2A and 2B.

Figure 3:
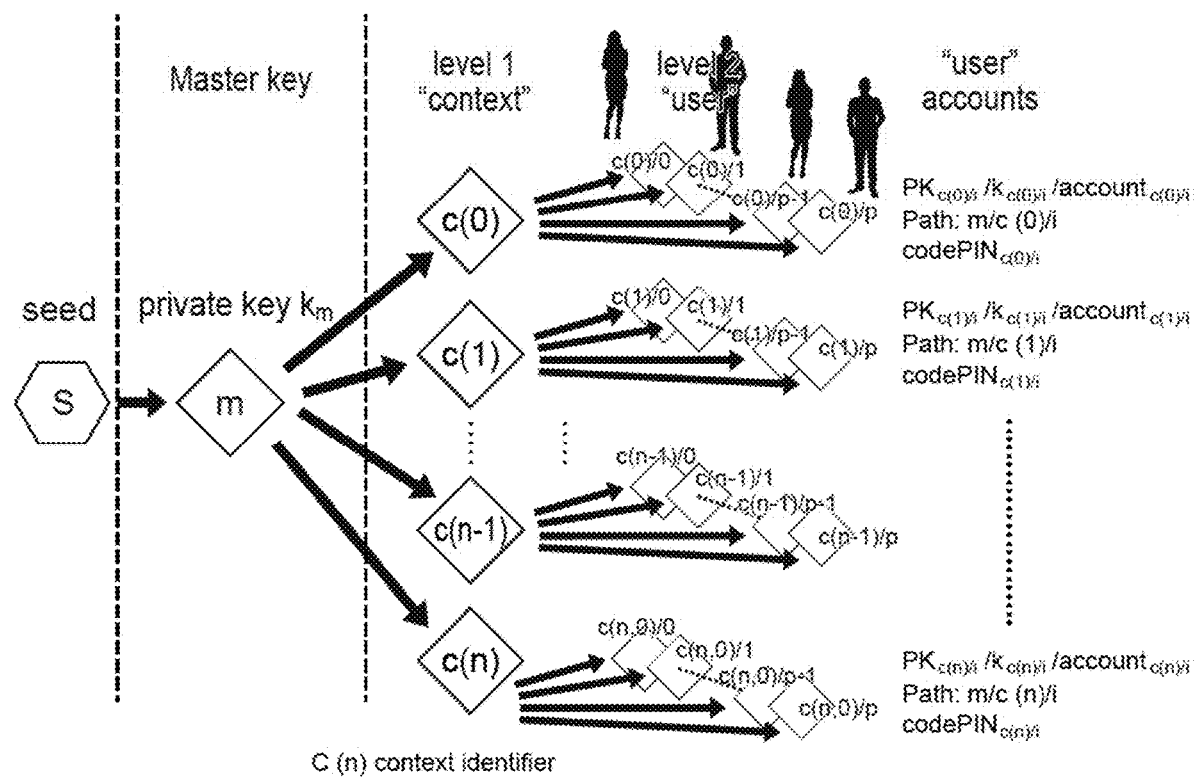
FIG. 3 diagrammatically represents the structure of a keys portfolio that can be generated by the portfolio generation method according to this invention.

FIG. 3 diagrammatically represents the structure of an HD keys portfolio that can be generated in the framework of this invention.

Level "0" of the tree structure, or the root, corresponds to a master private key, $k_m$, obtained by hashing a random seed (or entropy) advantageously coded in the form of a mnemonic code. Hashing may be done by a hashing function, or even a combination of hashing functions. The hashing result provides firstly the master private key, and secondly a chain code, $CCk_m$, associated with this same key. The master public key, $PK_m$, is obtained from the master private key using an asymmetric cryptographic algorithm (for example $PK_m = k_m \cdot G$ for a cryptography algorithm on elliptical curve).

An administrator account can be created at level "0" of the tree structure, access to which is protected by an administrator authentication element (PIN code or administrator password).

The administrator account can be associated with the master private key, $k_m$, and with the corresponding master public key, $PK_m = k_m \cdot G$, and is identified by an administrator account identifier ($login_{adm}$). The administrator account contains an address in a secure memory area in which the administrator authentication element is stored as described below.

Alternatively, the administrator account can be associated with a node located lower down in the tree structure.

Access to the administrator account makes it possible to create a plurality of context identifiers, at level "1" of the tree structure, each context identifier pointing to an associated memory area in which conditions for use of a private key in said context are stored.

Context identifiers are denoted c(1), . . . , c(n), each context identifier pointing to a memory area in which the conditions under which a private key is authorized for use are stored.

In particular, a usage context can be a geographic area, a time range, an association with a host device, a connection to a network, etc.

Usage conditions for a geographic area may for example be being or not being in a given perimeter.

Usage conditions for a time range can be being or not being inside this time range.

A condition of association with a host device or connections to a network can be associated with this device or connected to this network.

Obviously, usage contexts can be composite and include combinations of several types of conditions. For example, the use of a private key can be authorized only within a certain perimeter and within a certain time range.

When connected to the administrator account, level "2" user accounts in the structure can also be created. In general, each user account is associated with a usage context. However in some cases, a user account may not be associated with a context, regardless of whether this context is considered to be explicit or defined by default, or the user account may for example be an administrator account itself, delegate of an administrator account located at a higher level in the tree structure.

Each user account has an identifier ($login_{user}$) and its access is protected by an authentication element (for example a PIN code or a password).

The identifier of a user account is hashed by means of a hashing function (or a combination of hashing functions) and the hashing result provides an index, Ind, or as we will assume later on herein, a pair of indices, $Ind_1, Ind_2$, used to generate the user's private key, $k_{user}$:

$$(Ind_1, Ind_2) = Hash(login_{user}) \quad (6)$$

The user's private key $k_{user}$ is obtained by normal or hardened generation operations, starting from child key indices along the path, namely:

$$k_{user} = CKD_{priv}(CKD_{priv}(CKD_{priv}(k_m, c(i)), Ind_1), Ind_2) \quad (7)$$

As before, normal generation operations and hardened generation operations can be envisaged successively along the path in the tree structure.

Starting from the private key $k_{user}$, the corresponding public key in the asymmetric cryptosystem is generated, namely for example in the case of a cryptosystem on an elliptical curve $PK_{user} = k_{user} \cdot G$.

The private key, $k_{user}$, is stored at a memory address in a secure area, appearing in the user account.

The address of the user account from which the user will be able to send transactions to a blockchain, is obtained by hashing the public key $PK_{user}$, by means of a hashing function or a combination of hashing functions.

$$account_{user} = Hash(PK_{user}) \quad (8)$$

wherein Hash corresponds to the hashing function or to the combination of hashing functions. For example, we will use keccack256 as the hashing function to obtain an ethereum account address and the combination of functions sha256 and ripemd160 to obtain a bitcoin address, in a manner per se.

In summary, a user account is associated with a path in the tree structure:

$$path = m/c(i)/Ind_1/Ind_2 \quad (9)$$

that can be used to generate the private key of this user, using relation (7).

Although the tree structure in FIG. 3 has a depth N=3, it should be noted that tree structures with greater depths could also be considered. For example, a path may comply with the BIP-44 format for the first levels, continue with a context level and finally, terminate by a user level, in others words at a user account (or equivalently, the user's private key). In general, the path to the user account in the tree structure will be defined by:

$$path = m/ \ldots /c(i)/Ind_1/Ind_2 \quad (10)$$

The user account contains the master private key, $k_{user}$, the corresponding master public key, $PK_{user} = k_{user} \cdot G$ and the identifier of the user account ($login_{user}$). The user account also contains an address in a secure memory area in which a user authentication element is stored as specified below.

Generation of the HD portfolio comprises an initialization phase done by a portfolio administrator and a phase of setting parameters for at least one user.

Figure 4:
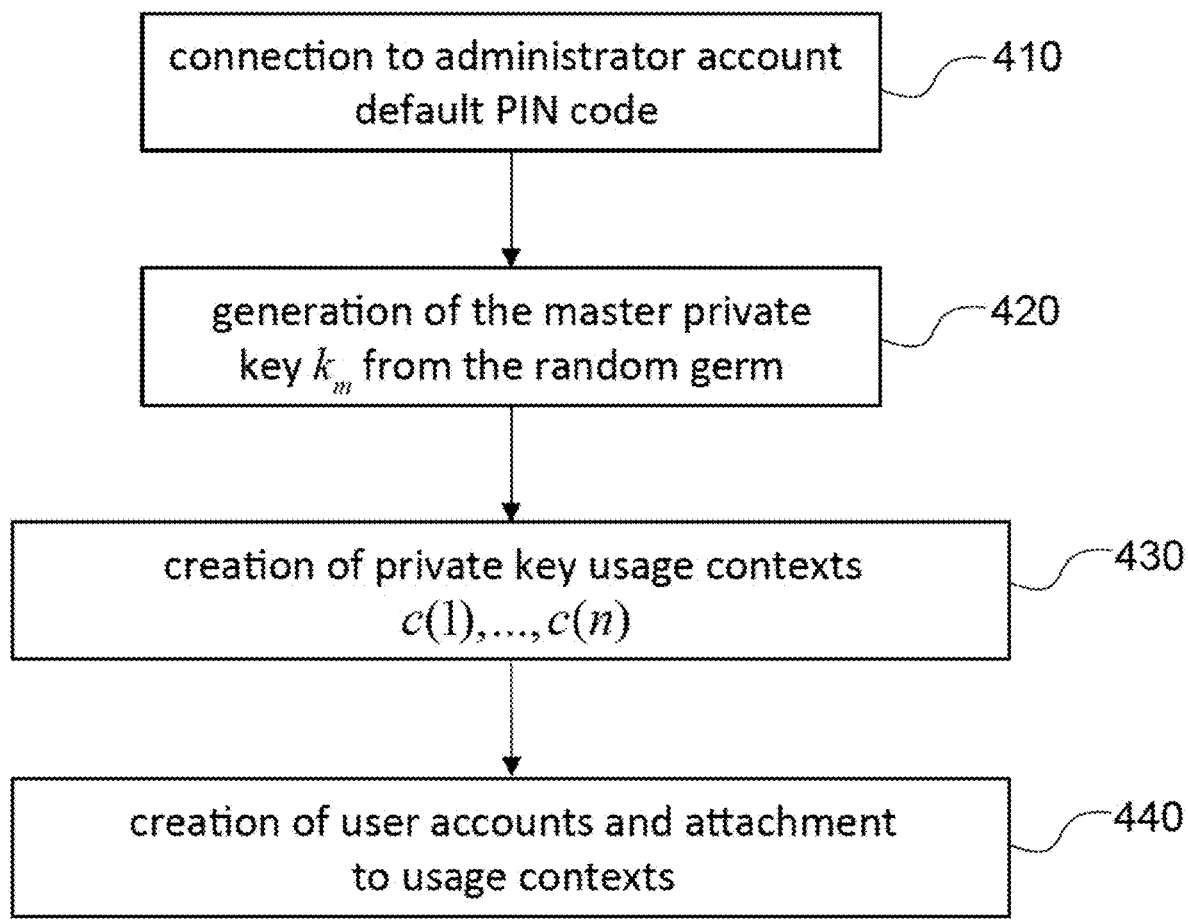
FIG. 4 represents the flowchart for an initialization phase in a method of generating a keys portfolio according to one embodiment of the invention.

FIG. 4 represents the flowchart for an initialization phase of a hierarchical deterministic keys portfolio according to one embodiment of the invention.

The portfolio administrator is responsible for configuring the accounts of the different users and particularly for indicating the conditions under which these users can use their private keys.

The administrator account can correspond to a default path in the tree structure. For example, the user account with null index and the null context identifier (no context) can be assigned to the administrator by default. The administrator account will then be characterized by $Ind_1=0$, $Ind_2=0$, $c(i)=0$ and the path will be defined by m/ . . . /0/0/0. It is important to note that in such a case, the administrator account is not located at level 0 in the tree structure, which may be preferred for security reasons. A default PIN code is also assigned to the administrator.

The administrator connects to his account in step 410 at the time of the first connection, authenticating himself using the default PIN code. He then modifies his PIN code for subsequent accesses.

In step 420, the administrator generates the master private key, $k_m$, starting from the random seed, and the corresponding master public key, $PK_m$.

During his first connection or during a subsequent access, the administrator can create private key usage contexts in 430, c(1), c(2), . . . , c(n), specifying the conditions under which the keys can be used for each context. The conditions associated with a context c(i) are stored in a memory area pointed to by c(i).

Thus for example, a first context can correspond to a geographic context and the associated usage conditions can specify a predetermined area around a reference point. A second context can correspond to a temporal context and the associated usage conditions can specify a predetermined temporal range $[T_{min}, T_{max}]$.

The administrator can then create a user account in 440, attaching it to one of the above-mentioned contexts or, in some cases, not attaching it to any context (default usage context or implicit context). The user account will be assigned an identifier, $login_{user}$, and a default authentication element (PIN code) that can be personalized during the first connection.

In some cases, the administrator will be able to delegate part of his prerogatives to a secondary administrator.

For example, the portfolio administrator will be able to create general user contexts and delegate the possibility of creating particular usage contexts to secondary administrators. Thus, for example, it could be envisaged that an administrator could delegate his geographic usage context creation rights to regional administrators, each of the regional administrators then only being able to create usage contexts in the region for which he is responsible.

Figure 5:
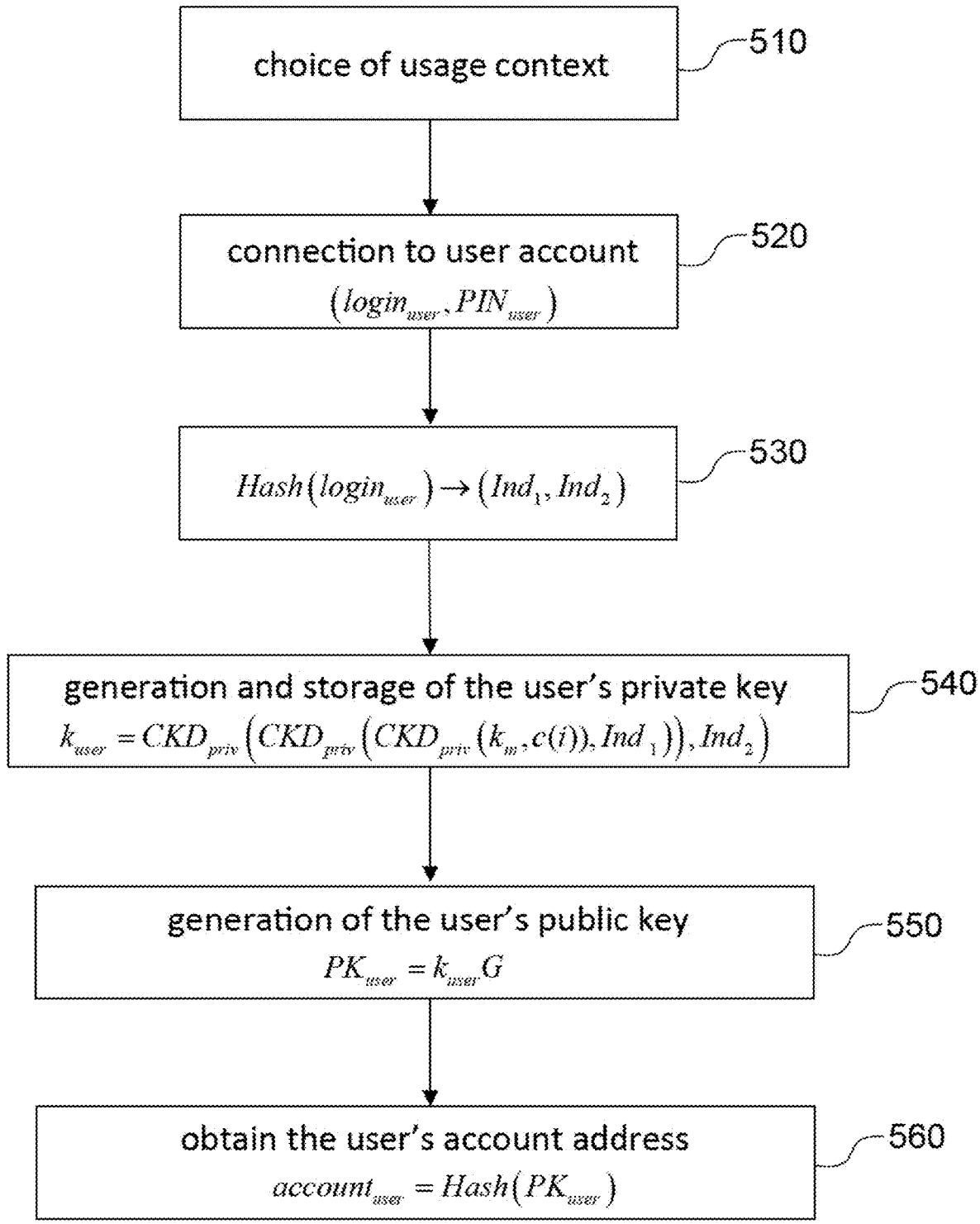
FIG. 5 represents the flowchart for a parametering phase in a method of generating a keys portfolio according to one embodiment of the invention.

FIG. 5 represents the flowchart for a parameter setting phase of a keys portfolio according to one embodiment of the invention;

This parameter setting phase assumes that the initialization phase of the portfolio had already been done by the administrator.

In step 510, the user is prompted to choose the usage context in which he would like to operate. This step may be optional if the context is selected by default or if it is provided by an external device.

In step 520, the user connects to his account by providing his identifier and his authentication element. It should be noted that a user can have a plurality of accounts under different contexts.

During the first connection, the authentication element is the element that was granted to him by default by the administrator. He is then prompted to personalize his authentication element in a manner known in itself.

In step 530, after the user has identified himself and the authentication element has been successfully verified, the user's identifier is submitted to a hashing function (or a combination of hashing functions). The index, Ind, or the pair of indices, $Ind_1$, $Ind_2$, used to generate his private key, is extracted from the hashing result.

In step 540, the user's private key is generated by means of normal or hardened generation operations according to the above-mentioned meaning, starting from the master private key and indices of nodes along the path. For example, the private key can be generated using expression (7) when only normal generation operations are used.

The user's private key is then stored in a secure memory area associated with the user's account.

In 550, the user's corresponding public key is generated in an asymmetric cryptosystem, for example $PK_{user} = k_{user} \cdot G$, as described above.

In step 560, the user's account address is obtained by hashing the public key, $account_{user} = Hash(PK_{user})$. This account address may be used by the user to send transactions to a blockchain provided that the conditions specified in the usage context are satisfied.

Thus for example, when the user has previously formed a transaction and would like to sign it using his private key to send it to the blockchain, the user opens his portfolio application, accesses his user account in the chosen context, identifies himself and authenticates himself as described above.

The private key can be generated and the transaction can be signed consecutively, during the same session. In other words, the private key can be generated and the transaction can be signed automatically if usage conditions for this session are satisfied. Parameter settings and the signature by private key than take place during the same session.

Alternatively, the private key may be generated during the user's first connection and the signature may only be made during a later session, if the usage conditions are satisfied during this session. Parameter settings and the signature by private key than take place in distinct sessions.

According to one variant, the signature of the transaction may require a physical action by the user to validate the signature of the transaction, in addition to context usage conditions being satisfied. For example, if the keys portfolio is hosted in a mobile device such as a dongle provided with a push button, the signature can be validated by the user pressing on the button in question.

Figure 6:
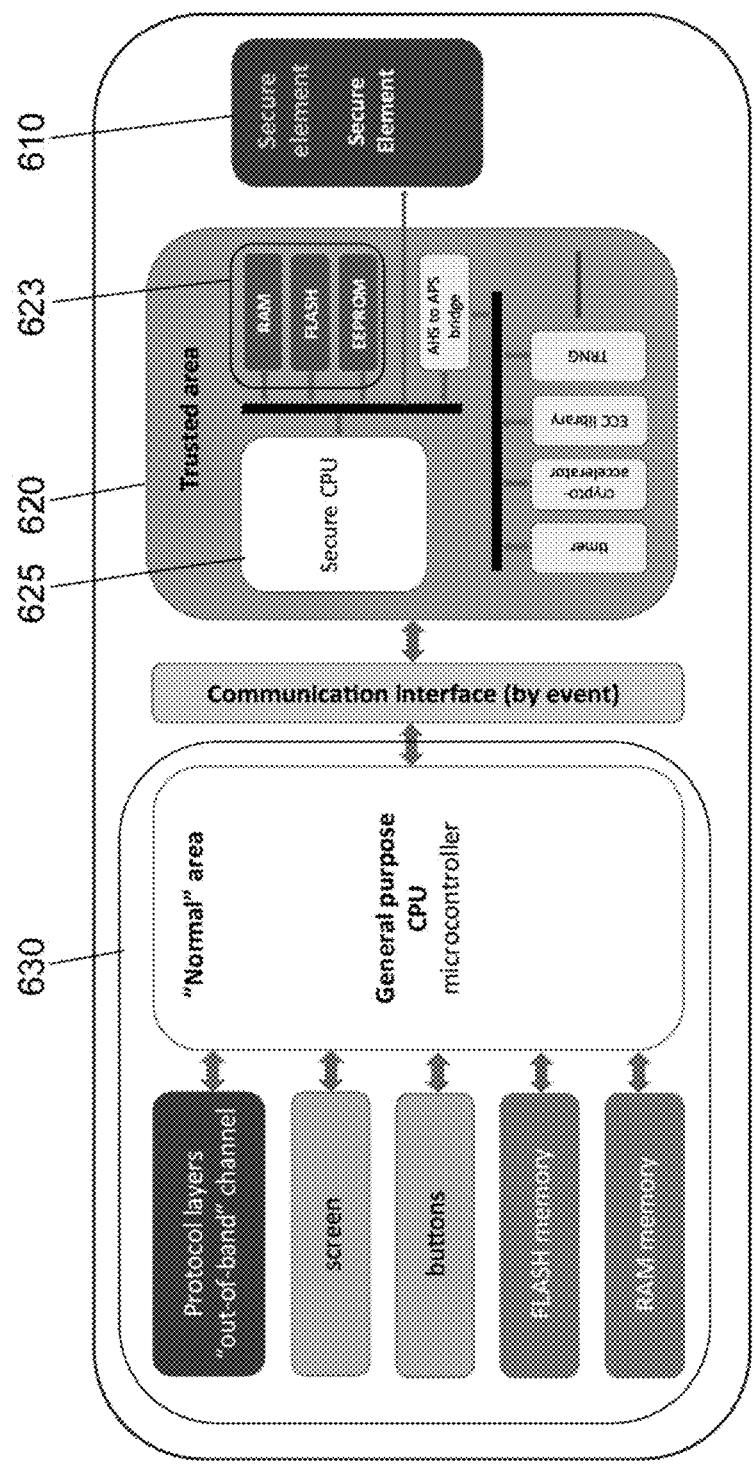
FIG. 6 diagrammatically represents the structure of a mobile device on which there is an onboard keys portfolio, according to one embodiment of the invention.

FIG. 6 diagrammatically represents the structure of a mobile device on which there is an onboard keys portfolio, according to one embodiment of the invention.

As an illustration, this mobile device may be a smart phone, a badge reader or a dongle equipped with an HMI interface (screen and buttons).

In all cases, this device is composed of different parts with distinct security levels.

A first high security part is composed of a Secure Element (SE), 610, in which the administrator's and the user's (or even several users') random seed and authentication elements (PIN codes, passwords) are stored.

A second part, 620, is composed of a trusted area comprising firstly a secure memory area 623, and secondly a secure execution area.

Whenever possible, the master private key and the private keys of users generated during the initialization phase and the usage phase respectively, are stored in the secure element, 610. By default, they will be saved in the secure memory area, 623. Considering these two options, it will be considered that the secure memory area can extend to the memory of the secure element.

The secure memory area (in the previous extended meaning) also contains the conditions of the different private key usage contexts for the different users. More precisely, each context identifier $c(i)$ points towards an address at which the corresponding usage conditions are stored.

The Trusted Execution Environment comprises in particular a secure processor, 625, an entropic generator, a cryptographic accelerator, etc. Inside this area, in particular cryptographic functions can be executed such as generation of the master key from the random germ, elementary normal and hardened operations to generate private keys $CKD_{priv}^n$ and $CKD_{priv}^h$, the calculation of a public key corresponding to a private key, the digital signature of a transaction by means of a user's private key (for example using the ECDSA algorithm), and the verification that conditions of a usage context are actually satisfied.

The mobile device also comprises a third non-secure part, 630, called the normal area comprising a microprocessor or a microcontroller, RAM and ROM memories. This third part also comprises an HMI interface (screen, buttons, etc.) that the administrator and a user can use to dialogue with the portfolio generation application in the initialization and usage phases respectively.

The man skilled in the art will understand that the administrator starts by initializing the mobile device as described with reference to FIG. 4 and that that parameters for this device are then set and the device is then used as described with reference to FIG. 5. Such a device can be personal to one user or it can be common to several users, each user having his specific account (or specific accounts in different contexts). In case of a loss, it is easy to regenerate the entire tree structure if the random seed (or the mnemonic code), the identifiers of the administrator and users, and usage conditions, are known. It should be noted that when even a hacker manages to regenerate said tree structure or to access a specific account, he could not use the specific account(s) because the authentication elements themselves are protected.

Furthermore, it would be almost impossible for a third party external to the entity to which the administrator/users belong to trace transactions signed by the same user, by correlation. On the other hand, the administrator will find it easy to assure that transactions have actually been signed by authorized users in the required usage contexts.

Figure 7:
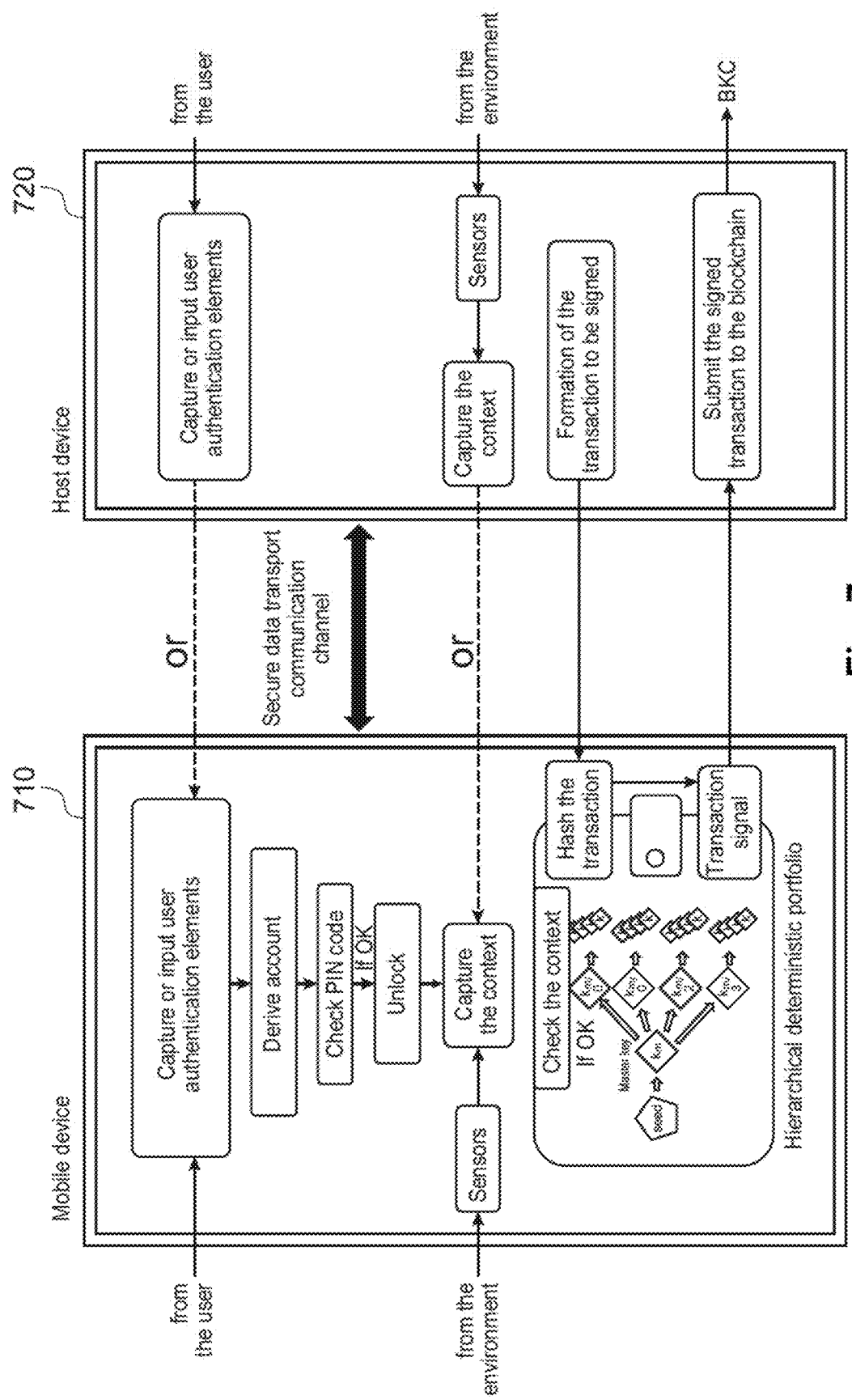
FIG. 7 represents an example of the use of a mobile device hosting a keys portfolio according to one embodiment of the invention.

FIG. 7 represents an example of the use of a mobile object hosting a keys portfolio according to one embodiment of the invention.

This example of use involves a mobile device, 710, of the type illustrated in FIG. 6 and a host device, 720, hosting a light client of the blockchain.

It is assumed that the private keys portfolio was initialized in the mobile device, and possibly parametered by a user.

When this user wants to sign a transaction with his private key to transmit it to the blockchain, he opens a session on the mobile device by entering his identifier (login) and his authentication element(s) (PIN code, password). Alternatively, the user can authenticate himself with the mobile device using a key conforming with the FIDO2 protocol. Optionally, the mobile device can be configured to require a multifactorial authentication.

According to one variant, the user can identify and authenticate himself with the host device, the identifier and the authentication elements then being transmitted to the mobile device using a secure channel.

In most cases, the user is prompted to enter the identifier of the usage context in which he would like to operate, before or after identifying and authenticating himself. As before, this identifier can be entered on the mobile device or the host device. In some cases, the usage context can be a default usage context, for example it can be deduced from the mobile application started by the user or the proximity of the host device.

The portfolio application that is hosted on the mobile device, performs hashing of the user's identifier ($login_{user}$) and uses it to deduce an index or a pair of indices ($Ind_1, Ind_2$). It then checks that here is no user account associated with the usage context and with the index or the pair of indices thus obtained, then verifies that the entered PIN code is the same as the code stored in the secure memory area, at the address stored in the user's account.

In case of an identification failure (no account in the context) or an authentication failure (incorrect authentication element), the mobile device signals this problem to the user.

In case of success, access to the account is unlocked and the user can use his user account to sign a transaction with his private key.

More precisely, the portfolio application firstly verifies that context conditions are actually satisfied. To achieve this, a sensor present in the mobile device or the host device provides context data (for example GPS position, time, Wifi switch identifier, BLE identifier, etc.) and these data are compared with the conditions in question, stored in the secure memory area, at an address stored in the user's account.

When context conditions are not satisfied, an error message is displayed on the mobile device. Conversely, when the conditions in question have been satisfied, the transaction formed by the user on the host device is supplied to the portfolio application.

The transaction can then be signed automatically by the user's private key. This key can be generated dynamically (for example using the expression (7)) if it is not already stored in the trusted area, or read from the trusted area if it has already been generated in a previous session.

According to one variant, signature by the private key may also require a physical action by the user, for example to press on a button on the mobile device to validate signature of the transaction.

The transaction thus signed is then sent to the host device that sends it the blockchain starting from the address of the user's account.

The invention claimed is:

1. A method of generating a hierarchical deterministic keys portfolio containing private keys according to a tree structure to sign transactions sent to a blockchain, said method comprising:

creating, during an initialization phase, an administrator account;

protecting, during the initialization phase, access to the administrator account by an administrator authentication element;

generating, during the initialization phase, a master private key ($k_m$) by hashing a random seed, the master private key being stored in a secure memory area of a mobile device;

creating, during a parameter setting phase, a plurality of usage context identifiers from the administrator account, each usage context identifier pointing to an address in the secure memory area in which conditions for use of a private key in said context are stored;

creating, during the parameter setting phase, a plurality of user accounts from the administrator account, each user account being associated with a private key in the tree structure, each user account being identified by an identifier and access to each user account being protected by a user authentication element, the private key of a corresponding user being obtained from the master private key, the usage context identifier to which the user account is attached, and an identifier of the user;

hashing the identifier and using the hashed identifier to deduce at least one index; and using the at least one index to generate the private key of the user.

2. The method according to claim 1, wherein the private key of the user, $k_{user}$, is obtained by calculating $k_{user} = CKD_{priv}(CKD_{priv}(CKD_{priv}(k_m, c(i)), Ind_1)), Ind_2)$ wherein $CKD_{priv}$ designates a normal or hardened operation to generate a child private key from a parent private key in a tree structure, c(i) is the usage context identifier to which the user account is attached and $Ind_1, Ind_2$ represents a pair of indices extracted from a result of hashing the user identifier using at least one hashing function.

3. The method according to claim 2, wherein the normal generation operation comprises the generation of a parent public key ($PK_{parent}$) from the corresponding parent private key ($k_{parent}$), concatenation with the parent public key of a parent chain code ($CCK_{parent}$) to obtain an extended public key ($PK_{parent}^{ext}$), the combination of said extended public key with a child key index (i) that it is wished to generate, the result of said combination being hashed to provide a hashing result, a first part of the hashing result being combined with the parent private key to give the child private key, a second part of the hashing result providing a child chain code ($CCK_{child}$).

4. The method according to claim 2, wherein the hardened generation operation comprises concatenation with the parent private key ($k_{parent}$) of a parent chain code ($CCK_{parent}$) to obtain an extended private key ($PK_{parent}^{ext}$), the combination of said extended private key with a child key index (i) that it is wished to generate, the result of said combination being hashed to provide a hashing result, a first part of the hashing result being combined with the parent private key to give the child private key, a second part of the hashing result providing a child chain code ($CCk_{child}$).

5. The method according to claim 1, wherein the stored usage conditions with regard to an initialisation context are chosen from among a predetermined geographic area, a predetermined time range, an association with a predetermined host device or a connection to a predetermined network.

6. The method according to claim 1, wherein the private key of the user is used as a starting point to generate a corresponding public key ($PK_{user}$) of the user in an asymmetric cryptosystem and in that the public key of the user is hashed to obtain a user account address ($account_{user}$), the address of the user account being stored in the user account.

7. A method of using a hierarchical deterministic keys portfolio generated by a generation method to sign a transaction addressed to a blockchain, said portfolio having been parameterized for at least one user and being hosted on a mobile device connected to a host device through a secure channel, the generation method comprising:
creatin, during an initialization phase, an administrator account;
protecting, during the initialization phase, access to the administrator account by an administrator authentication element;
generating, during the initialization phase, a master private key ($k_m$) by hashing a random seed, the master private key being stored in a secure memory area of a mobile device;
creatin, during a parameter setting phase, a plurality of usage context identifiers from the administrator account, each usage context identifier pointing to an address in the secure memory area in which conditions for use of a private key in said context are stored; and
creatin, during the parameter setting phase, a plurality of user accounts from the administrator account, each user account being associated with a private key in a tree structure, each user account being identified by an identifier and access to each user account being protected by a user authentication element stored in the secure memory area of the mobile device, the private key of a corresponding user being obtained from the master private key, the usage context identifier to which the user account is attached, and an identifier of the user,
the method of using the hierarchical deterministic keys portfolio further comprising:
identifying the user using the corresponding user identifier and authenticates the user with the mobile device or the host device using an authentication element;
filling in, by the user, a usage context identifier with the mobile device or the host device;
hashing, by the mobile device, the identifier and using, by the mobile device, the hashed identifier to deduce at least one index;
verifying, by the mobile device, that there is an existing user account in the portfolio associated with the usage context identifier and with the at least one index, then verifying that the user's authentication element is the same as that stored in the secure memory area of the mobile device, at an address specified by the user account; and
when the verifying is successful,
verifying when context data supplied by a sensor of the mobile device satisfy the usage conditions stored in the secure memory area at an address stored in the user account; and if these conditions are satisfied, and
signing a transaction formed by the host device by the private key of the user, the signed transaction being returned to the host device to be transmitted to the blockchain.

8. The method according to claim 7, wherein a signature of the transaction using the private key of the user is made automatically by the host device, without any action by the user.

9. The method according to claim 7, wherein a signature of the transaction using the private key of the user also requires a physical action by the user on an element of the mobile device.

10. The method according to claim 8, wherein the transaction is sent from the user account address obtained by hashing the public key of the user stored in the user account.

11. The method according to claim 9, wherein the transaction is sent from the user account address obtained by hashing the public key of the user stored in the user account.

12. A method of generating a hierarchical deterministic keys portfolio containing private keys according to a tree structure to sign transactions sent to a blockchain, said method comprising:
creating, during an initialization phase, an administrator account;
protecting, during the initialization phase, access to the administrator account by an administrator authentication element;
generating, during the initialization phase, a master private key ($k_m$) by hashing a random seed, the master private key being stored in a secure memory area of a mobile device;
creating, during a parameter setting phase, a plurality of usage context identifiers from the administrator account, each usage context identifier pointing to an address in the secure memory area in which conditions for use of a private key in said context are stored;
creating, during the parameter setting phase, a plurality of user accounts from the administrator account, each user account being associated with a private key in the tree structure, each user account being identified by an identifier and access to each user account being protected by a user authentication element stored in the secure memory area of the mobile device, the private key of a corresponding user being obtained from the master private key, the usage context identifier to which the user account is attached, and an identifier of the user;
hashing the identifier and using the hashed identifier to deduce at least one index; and
verifying that there is an existing user account in the portfolio associated with the usage context identifier and with the at least one index, then verifying that the user's authentication element is the same as that stored in the secure memory area of the mobile device, at an address specified by the user account.

13. The method according to claim 12, wherein the private key of the user, $k_{user}$, is obtained by calculating
$k_{user} = CKD_{priv}(CKD_{priv}(CKD_{priv}(k_m, c(i)), Ind_1), Ind_2)$
wherein $CKD_{priv}$ designates a normal or hardened operation to generate a child private key from a parent private key in a tree structure, c(i) is the usage context identifier to which the user account is attached and $Ind_1, Ind_2$ represents a pair of indices extracted from a result of hashing the user identifier using at least one hashing function.

14. The method according to claim 13, wherein the normal generation operation comprises the generation of a parent public key ($PK_{parent}$) from the corresponding parent private key ($k_{parent}$), concatenation with the parent public key of a parent chain code ($CCK_{parent}$) to obtain an extended public key ($PK_{parent}^{ext}$) the combination of said extended public key with a child key index (i) that it is wished to generate, the result of said combination being hashed to provide a hashing result, a first part of the hashing result being combined with the parent private key to give the child private key, a second part of the hashing result providing a child chain code ($CCK_{child}$).

15. The method according to claim 13, wherein the hardened generation operation comprises concatenation with the parent private key ($k_{parent}$) of a parent chain code ($CCk_{parent}$) to obtain an extended private key ($PK_{parent}^{ext}$), the combination of said extended private key with a child key index (i) that it is wished to generate, the result of said combination being hashed to provide a hashing result, a first part of the hashing result being combined with the parent private key to give the child private key, a second part of the hashing result providing a child chain code ($CCk_{child}$).

16. The method according to claim 12, wherein the stored usage conditions with regard to an initialisation context are chosen from among a predetermined geographic area, a predetermined time range, an association with a predetermined host device or a connection to a predetermined network.

17. The method according to claim 12, wherein the private key of the user is used as a starting point to generate a corresponding public key ($PK_{user}$) of the user in an asymmetric cryptosystem and in that the public key of the user is hashed to obtain a user account address ($account_{user}$), the address of the user account being stored in the user account.

18. The method according to claim 12, comprising using the at least one index to generate the private key of the user.

* * * * *